United States Patent
Cooper et al.

(10) Patent No.: US 9,850,359 B2
(45) Date of Patent: Dec. 26, 2017

(54) VOIDED PLASTICS FILM

(71) Applicant: Arjobex Limited, Clacton-on-Sea (GB)

(72) Inventors: Jonathan Cooper, Dedham (GB); Bharath Chandra, Charlotte, NC (US); Mark Grimbley, Chelmsford (GB)

(73) Assignee: ARJOBEX LIMITED, Clacton-on-Sea (GB)

( * ) Notice: Subject to any disclaimer, the term of this patent is extended or adjusted under 35 U.S.C. 154(b) by 88 days.

(21) Appl. No.: 14/850,530

(22) Filed: Sep. 10, 2015

(65) Prior Publication Data

US 2016/0075844 A1 Mar. 17, 2016

(30) Foreign Application Priority Data

Sep. 17, 2014 (GB) .................. 1416389.3

(51) Int. Cl.

| | | |
|---|---|---|
| *C08J 9/00* | (2006.01) | |
| *B32B 27/20* | (2006.01) | |
| *B32B 27/32* | (2006.01) | |
| *B29C 55/02* | (2006.01) | |
| *C08L 23/06* | (2006.01) | |
| *B32B 27/10* | (2006.01) | |
| *C08J 5/18* | (2006.01) | |
| *B29C 47/56* | (2006.01) | |
| *B29C 47/00* | (2006.01) | |
| *B29C 47/06* | (2006.01) | |
| *B29K 23/00* | (2006.01) | |
| *B29K 33/04* | (2006.01) | |
| *B29C 55/16* | (2006.01) | |
| *C08K 3/22* | (2006.01) | |
| *C08K 3/26* | (2006.01) | |

(52) U.S. Cl.
CPC ........... *C08J 9/0066* (2013.01); *B29C 55/023* (2013.01); *B32B 27/10* (2013.01); *B32B 27/20* (2013.01); *B32B 27/32* (2013.01); *C08J 5/18* (2013.01); *C08L 23/06* (2013.01); *B29C 47/0004* (2013.01); *B29C 47/0021* (2013.01); *B29C 47/0057* (2013.01); *B29C 47/065* (2013.01); *B29C 47/56* (2013.01); *B29C 55/16* (2013.01); *B29K 2023/065* (2013.01); *B29K 2033/04* (2013.01); *B32B 2255/26* (2013.01); *B32B 2264/102* (2013.01); *B32B 2264/104* (2013.01); *B32B 2307/518* (2013.01); *B32B 2307/75* (2013.01); *C08J 2323/06* (2013.01); *C08K 2003/2241* (2013.01); *C08K 2003/265* (2013.01)

(58) Field of Classification Search
CPC ............ C08J 9/0023; C08J 2323/00–2323/24
See application file for complete search history.

(56) References Cited

U.S. PATENT DOCUMENTS

| | | | | |
|---|---|---|---|---|
| 3,463,752 A * | 8/1969 | Bornstein | ............... | C08L 23/02 522/79 |
| 3,787,342 A * | 1/1974 | Berry | ..................... | C09J 177/06 524/606 |
| 5,910,527 A * | 6/1999 | Alper | ................... | C08K 5/0008 156/327 |
| 6,040,042 A * | 3/2000 | Dalgleish | ............... | C08K 5/103 428/304.4 |
| 2011/0200817 A1* | 8/2011 | Duckworth | .......... | C09D 133/02 428/336 |
| 2011/0213120 A1* | 9/2011 | Astrologes | .............. | C08L 93/04 530/218 |
| 2016/0264821 A1* | 9/2016 | Nelson | ................... | C09J 193/04 |

FOREIGN PATENT DOCUMENTS

| | | |
|---|---|---|
| EP | 0863177 A1 | 9/1998 |
| EP | 1486529 A1 | 12/2004 |
| JP | 2011-219562 A | 11/2011 |
| WO | WO2014/066329 A1 | 5/2014 |

* cited by examiner

*Primary Examiner* — Kara B Boyle
*Assistant Examiner* — Christina H Wales
(74) *Attorney, Agent, or Firm* — Knobbe Martens Olson & Bear LLP

(57) ABSTRACT

A formulation for making voided plastics film including a polyolefin, a filler and a voiding agent. The voiding agent is a glycerol ester of fumaric rosin or a pentaerythritol ester of fumaric rosin.

16 Claims, No Drawings

VOIDED PLASTICS FILM

BACKGROUND

Technical Field

The embodiments described herein relate to a voided plastics film and also to a formulation for making a voided plastics film and a method of making such a film. The embodiments are particularly, but not exclusively, concerned with composite plastics films or sheets having a voided base or core layer and at least one skin layer, and preferably having an external printable surface, and to synthetic papers produced therefrom.

Description of the Related Art

The term "synthetic paper" is used herein and throughout the specification to mean plastics film and sheet products having a feel and printability similar to cellulose paper. Synthetic paper is a polymeric material, typically based on polyolefins (for example polyethylene or polypropylene), which is stretched and orientated to form a sheet with the stiffness and feel of cellulose paper. It has been recognised that plastics sheet products of these types can provide an improved alternative to cellulose paper where durability and toughness are required. Plastics sheets produced from polyolefins have several advantages over other plastics since they offer UV resistance, good tear strength, water resistance and the ability to be recycled in many post-consumer waste applications.

Synthetic papers have been produced commercially by the plastics industry for many years and have taken a number of different forms. They have included products having voided (i.e. multicellular) or unvoided structures, some of which have been coated with filler- and/or pigment-containing surface coatings to improve printing qualities. The voiding technique has frequently been used to reduce the density of the synthetic paper produced.

As described in EP0703071A a commonly used voiding agent is a zinc-calcium resinate, which causes the voiding when a heated sheet of synthetic paper is stretched. This technique produces a very serviceable sheet which has gained widespread commercial acceptance, particularly when it incorporates white inert fillers. These fillers and the voids typically give rise to sheets with a brightness (ISO 2470) of 80-88%. This range of brightness is due in part to the fact that zinc calcium resinate has a yellow color.

EP0863177A describes an alternative synthetic paper composition in which a pentaerythritol ester of maleic rosin is used as the voiding agent. This composition produces a synthetic paper that is highly satisfactory in terms of its performance and physical characteristics. However, the pentaerythritol ester of maleic rosin used as the voiding agent is very expensive and only a limited supply is available. This limited supply availability is due to the fact that specific characteristics of elevated temperature softening behavior are needed and most readily available versions of pentaerythritol ester of maleic rosin are not suitable as voiding agents. This affects the price of the synthetic paper and the applications for which it is commercially suitable. It can also affect the profit margin of the producer.

It is therefore desirable to make a synthetic paper that matches or exceeds the physical characteristics of existing synthetic papers, but which uses an alternative voiding agent, in particular one that is more readily available and cheaper than a pentaerythritol ester of maleic rosin.

SUMMARY

According to one aspect, there is provided a formulation for making voided plastics film, the formulation comprising a polyolefin, a filler and a voiding agent, characterized in that the voiding agent is either a glycerol ester of fumaric rosin or a pentaerythritol ester of fumaric rosin.

The voiding agent, being either a glycerol ester of fumaric rosin or a pentaerythritol ester of fumaric rosin (or a combination thereof), is more readily available than the pentaerythritol ester of maleic rosin used previously, and are considerably less expensive. Synthetic papers made using either of these voiding agents possess physical properties that match or exceed the favorable physical characteristics of existing synthetic papers.

These voiding agents may be characterized generically as chemically modified rosins, or more specifically as rosin esters, which is a sub-category of chemically modified rosin. There are three available sources of suitable rosins suitable for use in the embodiments described herein:

1. Gum rosins, which are extracted from living pine trees by tapping
2. Tall oil rosins, which are a by-product of the paper pulping industry, and
3. Wood rosins, which are extracted by solvent from cut trees and wood stump.

Advantageously, the amount of the voiding agent comprising either a glycerol ester of fumaric rosin or a pentaerythritol ester of fumaric rosin in the formulation is in the range 4-18 parts by weight per 100 parts of the polyolefin.

Advantageously, the polyolefin comprises high density polyethylene (HDPE). Alternatively, the polyolefin may comprise polypropylene or a mixture of polyolefins.

Advantageously, the formulation includes polystyrene in the range 3.5-9 parts by weight per 100 parts of the polyolefin.

Advantageously, the filler comprises calcium carbonate in the range 12-37 parts by weight per 100 parts of the polyolefin.

Advantageously, the filler comprises titanium dioxide in the range 4-11 parts by weight per 100 parts of the polyolefin.

According to another aspect, there is provided a voided plastics film made from a formulation according to any one of the preceding embodiments, characterized in that the voiding agent in the formulation is a glycerol ester of a fumaric rosin or a pentaerythritol ester of a fumaric rosin.

Advantageously, the voided plastics film is a biaxially-oriented film.

In one embodiment, the voided plastics film has the composition shown below:

| Component | Parts by weight |
| --- | --- |
| High density polyethylene | 100 |
| Voiding agent (glycerol ester of fumaric rosin or pentaerythritol ester of fumaric rosin) | 4-18 |
| Polystyrene | 3.5-9 |
| Calcium carbonate filler | 12-37 |
| Titanium dioxide | 4-11 |

According to another aspect, there is provided a composite plastics film including a core or base layer and at least one skin layer, wherein the core or base layer comprises a voided plastics film according to any one of the preceding embodiments.

Advantageously, the core or base layer and the at least one skin layer are co-extruded, prior to biaxial orientation by stretching.

Advantageously, the composite plastics film comprises a synthetic paper.

Advantageously, the synthetic paper comprises at least one printable surface.

According to another aspect, there is provided a method of making a voided plastics film, the method including providing a formulation comprising a polyolefin, a filler and a voiding agent, forming a plastics sheet from the formulation, and orienting the plastics sheet biaxially by stretching the plastics sheet to form a voided plastics film; characterized in that the voiding agent is a glycerol ester of fumaric rosin or a pentaerythritol ester of fumaric rosin.

Advantageously, the method further includes providing a second formulation including a polyolefin, co-extruding the first formulation and the second formulation to form a composite plastics sheet, and orienting the composite plastics sheet biaxially to form a composite plastics film comprising a voided base or core layer and at least one skin layer.

Advantageously, the composite plastics film comprises a synthetic paper having a feel and printability similar to cellulose paper.

DETAILED DESCRIPTION OF THE PREFERRED EMBODIMENTS

The voiding agent is either a glycerol ester of fumaric acid-modified rosin or a pentaerythritol ester of a fumaric acid-modified rosin. To produce the voiding agent, a rosin is reacted with fumaric acid and glycerol or fumaric acid and pentaerythritol. The glycerol ester of fumaric rosin and the pentaerythritol ester of fumaric rosin suitably have an average minimum Ring and Ball softening point in the range of 155° C. to 175° C. A suitable glycerol ester of fumaric rosin is sold commercially by Socer Brasil Indústria e Comércio Ltda as RESIDHERE® AF-165 and a suitable pentaerythritol ester of fumaric rosin is available from Euro Yser Productos Quimicos SA as RD 18/26-III. The amount of the glycerol ester of fumaric rosin or pentaerythritol ester of fumaric rosin used in the formulation is suitably in the range from 4-18 parts by weight per hundred parts of the polyolefin in the formulation.

According to a further embodiment, there is provided a composite plastics film or sheet made from a formulation comprising a polyolefin, a filler and a voiding agent, characterized in that the voiding agent is a glycerol ester of fumaric rosin or pentaerythritol ester of fumaric rosin.

The composite plastics film or sheet made from the formulation is suitably a synthetic paper. The synthetic paper may comprise at least one skin layer and a base layer, which can also be termed the core layer if there is more than one skin layer e.g. one on either side of the base layer. The synthetic paper may be formed either:
  A. by single extrusion of a single composition in which the surfaces and the core portion of the single extrudate represent the skin and base layers respectively, or
  B. by co-extrusion of the composite from two or more compositions where the relatively thicker of two or more layers forms the base or core layer and the relatively thinner of the two or more layers represents the skin layer or layers, or
  C. by lamination of a plurality of layers whereby at least one of the outermost layers represents a skin layer and the layer(s) below said skin layer or in between the two outer surface layers represent the base or core layer, or
  D. by applying a coating of a printable layer on the skin layer of a sheet produced by any of the methods (A) to (C) above.

In one embodiment, sheets are produced by coextrusion and having a coating of a printable layer on the surface thereof. Methods of lamination and coextrusion are well known in the art. Descriptions of formulations comprising a polyolefin and methods for producing synthetic papers based on polyolefins can be found in our prior published GB-A-1470372, GB-A-1492771 and GB-A-1490512. Further, a description of particularly advantageous coatings can be found in our prior published GB-A-2177413. The concepts of all the aforementioned specifications are included herein by reference except that in each of these, the zinc calcium resinate in the formulation is replaced by the glycerol ester of fumaric rosin or pentaerythritol ester of fumaric rosin as the voiding agent according to the embodiments described herein.

Advantageously, the skin layer does not include a voiding agent.

As mentioned above, fillers are used in films/sheets such as e.g. synthetic paper intended for printing to provide an appropriate opaque white surface. These fillers are usually selected from inert minerals such as chalk, silica or clay. In addition, minor additives are also used to render the film/sheet anti-static.

It is well recognized that polyolefin films have low surface energies and this generally means that printing is difficult because the ink does not readily wet out the surface and the dried ink does not adhere sufficiently to the surface thereof. In order to overcome these problems, the surfaces of polyolefin films/sheets have frequently been subjected to various treatments such as e.g. a corona discharge treatment. Such treatments improve ink laydown and adhesion thereon sufficiently to provide a useful material. The material so treated may, in some cases, lack absorption and require specialized printing techniques.

The lack of absorption of such films/sheets used as e.g. synthetic paper can be overcome by applying thereon a coating comprising a major amount of an absorbent filler and a minor amount of an adhesive binder. The coating can be incorporated during the manufacturing process. Such a method yields a product that is receptive to print and such products have gained wide commercial acceptance. Where such coatings are inconvenient and expensive to apply and require a separate manufacturing process facility, or render the surface so treated susceptible to the adverse effects of water and solvents, a filler such as silica or calcium carbonate can be employed in the skin layer as well as the core.

The base layer in the film or sheet of the synthetic paper comprising polyolefins, filler and the voiding agent may have other components therein such as pigments, other fillers, rubbers and the like. Thus, the base layer may be of any composition such as is described in our prior published GB-A-1470372 and GB-A-1492771 except that the voiding agent is a glycerol ester of fumaric rosin or a pentaerythritol ester of fumaric rosin (or a combination thereof).

The composition of the base layer may comprise a blend of an orientable thermoplastic olefin polymer with about 4-18 parts by weight of the glycerol ester of fumaric rosin or pentaerythritol ester of fumaric rosin per hundred parts of the polyolefin in the blend. The glycerol ester of fumaric rosin or pentaerythritol ester of fumaric rosin preferably forms, at least in part, a separate phase uniformly distributed within the olefin polymer contained in the total composition of the base layer such that the composition is capable of being extruded and stretched to form a layer having a voided structure. The composition of the base layer may comprise a blend, within the aforementioned range, of a high density polyethylene and a glycerol ester of fumaric rosin or a pentaerythritol ester of fumaric rosin.

In one embodiment, the composition of the base layer is as follows (Table 1):

TABLE 1

BASE LAYER COMPOSITION

| Component | Parts by weight |
|---|---|
| High density polyethylene | 100 |
| Voiding agent (glycerol ester of fumaric rosin Or pentaerythritol ester of fumaric rosin) | 4-18 |
| Polystyrene | 3.5-9 |
| Calcium carbonate filler | 12-37 |
| Titanium dioxide | 4-11 |

The above base layer composition may optionally contain other additives such as e.g. an antioxidant and a lubricant.

The term high density polyethylene (HDPE) as used above and throughout the specification is meant to include, unless otherwise specified, polymers and copolymers of ethylene with minor amounts of other alpha-olefin monomers as is commonly understood in the industry and as described in the above-mentioned GB-A specifications. The term also includes mixtures of high density polyethylenes.

The thickness of the base layer is suitably greater than about 10 μm, is preferably greater than about 40 μm and is more preferably in the range from about 45-500 μm.

The surface layer of the synthetic paper, which may be a co-extrudate, is capable of receiving print and comprises a polyolefin. The polyolefin is suitably polyethylene but may comprise a mixture of olefin polymers.

The printable surface layer has a surface which is suitably textured or modified by the presence of a pigment and/or a filler, and suitably has a printability corresponding to a wettability of at least 40 dynes/cm.

The thickness of the surface layer is suitably below 50 μm, is preferably below 10 μm and is more preferably from about 1 to 8 μm.

The composition of the surface layer may also include other additives such as e.g. a lubricant (0-0.4% by weight); a wax, stearic acid or a metal stearate, especially calcium stearate; and an antistatic agent (0-2% by weight, preferably 0.5-1.5% by weight) of the ethoxylated amine type, all weights being based on the weight of the principal polyolefin component of the composition.

The presence of fillers and/or pigments in the surface layer(s) provides a better grip during stretching of the co-extruded layers and imparts improved printability.

The base layer and one or more of the surface layers may be co-extruded using co-extrusion equipment known in the plastics industry which may comprise one extruder for the composition employed to generate each layer and is adapted to feed a co-extrusion die fitted e.g. with appropriate flow distribution control or to feed a conventional die via an appropriate distributor block. More preferably, the co-extruded film or sheet comprises e.g. three layers with the base or core layer being sandwiched between two skin layers, and is made in a single step using separate extruders for the base or core layer and the skin layers, but using a single die block.

The film or sheet so formed may be oriented by stretching in a uniaxial or biaxial direction(s) according to known methods and this may be carried out sequentially or simultaneously. It is preferable to orientate the film/sheet by simultaneous biaxial stretching. Such orientation may be achieved e.g. by coextruding the layers in the form of a tube and inflating it in a known manner. However, to achieve a flat laying product, the layers are preferably co-extruded to form a continuous sheet or web, which is then stretched employing a flat-bed stretching apparatus preferably of the type described in our prior published GB-A-1374574 and GB-A-1442113. Stretching of thermoplastic webs using such apparatus is described in our prior published GB-A-1490512. The methods described in these publications are incorporated herein by reference.

The film or sheet produced from the formulations described above may be subjected to various treatments and surface coatings e.g. to enhance antistatic and printing qualities. It will be understood, however, that the surface layer destined to provide an external printable surface will usually be subjected to surface treatment such as oxidation via flame or corona discharge treatment to provide a more polar surface and the required wettability to more readily accept inks and coatings. Clearly, such treatments may be applied to the surface of a skin layer, whether or not such a layer is co-extruded to form the film or sheet.

Coatings that may be applied to the film or sheet so produced include aqueous coatings commonly used in the paper industry and especially latex-based coatings. Of particular value in the present context, however, are the coatings described in our prior published GB-A-2177413 as hereinbefore mentioned. It will be appreciated that adhesive coatings such as pressure-sensitive and heat-activated adhesive coatings may alternatively or additionally be applied to the film or sheet as may be desirable for particular uses such as e.g. making labels, which may be self-adhesive and may optionally have a peelable liner, tags, airline baggage tags, or hospital tags for patients etc.

Particular features are that the films and sheets thus produced:
 a. have good brightness with a narrow range of spread;
 b. are free from risk of yellowing whether as such or upon being subjected to heating, stretching or upon storage;
 c. are not adversely affected by the use of the new voiding agent;
 d. are integral;
 e. can provide a good key to further applied coatings; and
 f. have mechanical properties determined by the central thicker layer, which may be substantially non-absorbent.

The present embodiments are further illustrated with reference to the following Examples:

Example 1

The following composition (Table 2) was used to produce Compound "A" (used in the production of the core material):

TABLE 2

| Component | Weight % |
|---|---|
| Exxon Mobil Paxon ® AL55-003 HDPE (MFI 0.3 g/10 min & density 0.954 g/cm$^3$) | 50.23 |
| Heritage HM-10HD (80% CaCO$_3$ in 3 g/10 min MFI HDPE) | 26.49 |
| Ampacet 110438 (80% TiO$_2$ in 12 g/10 min MFI HDPE) | 7.64 |
| Styrosolution GPPS 1300 polystyrene | 5.11 |
| Socer Brasil Residhere AF-165 glycerol fumaric rosin | 10.19 |
| Akzo Nobel Armostat 300-XE50 antistatic additive | 0.2 |
| Mayzo BNX 1249 antioxidant additive | 0.14 |

HDPE = High density polyethylene
MFI = Melt flow index

Compound "A" indicated above was prepared by extruding a mixture of 32 wt % of Exxon Mobil Paxon® AL55-003 HDPE with 68 wt % of the concentrate mixture set out in Table 3 below.

TABLE 3

| Component | Weight % |
|---|---|
| Exxon Mobil Paxon ® AL55-003 HDPE (MFI 0.3 g/10 min & density 0.954 g/cm³) | 26.79 |
| Heritage HM-10HD (80% CaCO₃ in 3 g/10 min MFI HDPE) | 38.96 |
| Ampacet 110438 (80% TiO₂ in 12 g/10 min MFI HDPE) | 11.24 |
| Styrosolution GPPS 1300 polystyrene | 7.52 |
| Socer Brasil Residhere AF-165 glycerol fumaric rosin | 14.98 |
| Akzo Nobel Armostat 300-XE50 antistatic additive | 0.3 |
| Mayzo BNX 1249 antioxidant additive | 0.21 |

HDPE = High density polyethylene
MWI = Melt flow index

The above 32:68 mixture (Compound "A") formed the core layer, which was co-extruded with outer (top and bottom) skin layers each having the composition (Compound "B") set out in Table 4 below:

TABLE 4

| Component | Weight % |
|---|---|
| Exxon Mobil Paxon ® AL55-003 HDPE (MFI 0.3 g/10 min & density 0.954 g/cm³) | 72.0 |
| Chevron Phillips Marflex 7120X (LLDPE, MFI = 2.0 g/10 min & density = 0.919 g/cm³) | 25.0 |
| Akzo Nobel Armostat 300-XE50 antistatic additive | 2.0 |
| Ampacet 110401 antioxidant | 1.0 |

Compound "A" was fed to an in-line extruder of a twin extruder-distributor-sheeting die co-extrusion arrangement and Compound "B" was fed to a secondary extruder. The sheeting die and distributor were of conventional type enabling a three-layer co-extrudate to be produced continually comprising a layer of Compound "B" on each side of a layer of Compound "A".

The extruders were arranged to enable each to form and feed a substantially homogeneous melt into the distributor which was maintained at a temperature of 210° C. The die lips were adjusted to approximately 4.5 mm and the flow of each of the melts was adjusted to give a composite layered extrudate about 550 mm wide at an extrusion rate of 925 kg/hr. The weight % ratios of core layer to the skin layers were 92.5% to 7.5% (2×3.75%).

The composite extrudate was then fed directly onto and around a set of cooling and conditioning rollers running at a peripheral speed whereby the core material was brought to a temperature of approximately 122° C. and the outer layers each to a temperature of approximately 118° C. This resulted in a conditioned composite extrudate having an overall thickness of 1.5 mm, a core thickness of 1.388 mm and two outer layers each being about 0.056 mm thick.

The thus conditioned composite extrudate was then fed into a simultaneous biaxial stretching apparatus of the type described in our published GB-A-1442113 with reference to FIGS. 1 to 9 of that publication and arranged to provide a 4:1 stretch in each of the longitudinal or machine direction (MD) and transverse direction (TD).

The stretching apparatus was provided with a seven zone circulating air oven, the zones comprising preheat Zones 1 and 2, stretching Zones 3-5 and annealing Zones 6 and 7. The temperatures and lengths of the respective zones and the sheet speed are tabulated below in Table 5:

TABLE 5

| Zones | Temperature (° C.) | Length (metres) | Speed in (metres/min) |
|---|---|---|---|
| Preheat Zone 1 | 132 | 1.5 | 16.4 |
| Preheat Zone 2 | 132 | 1.5 | 16.4 |
| Stretch Zone 3 | 122 | 1.5 | Increasing |
| Stretch Zone 4 | 122 | 1.5 | Increasing |
| Stretch Zone 5 | 123 | 1.5 | Increasing |
| Annealing Zone 6 | 132 | 1.5 | 65.6 |
| Annealing Zone 7 | 92 | 1.5 | 65.6 |

The web gripping devices which were initially at a pitch of about 38 mm were heated to approximately 100° C. prior to contacting the sheet.

The composite plastics film thus produced had an average thickness of 143 microns and a substance of 80 g/m². The film was cooled, edge trimmed and passed through a corona discharge treatment unit adjusted to give a treatment level such that the wettability of the surface of each outer skin layer was greater than 40 dynes/cm, and then reeled. The wettability of the product was determined by the application of Sherman Surface Tension Ink 45 dynes/cm, formulated to demonstrate a wettability of at least 45 dynes/cm.

The composite plastics films described herein could be readily printed upon using conventional lithographic and gravure printing techniques.

The physical properties of the composite plastics films thus produced were as follows (Table 6):

TABLE 6

| | | |
|---|---|---|
| Substance (g/m²) | | 80 |
| Thickness (μm) | | 143 |
| Tensile Strength (N/mm²) | MD | 30 |
| ISO 527-3:1995 | TD | 25 |
| Elongation at Break (%) | MD | 90 |
| ISO 527-3:1995 | TD | 70 |
| Gurley Stiffness (mg) | MD | 53 |
| Tappi T543 | TD | 53 |
| Surface Cohesion (N/25 mm) | Face A | 7.5 |
| | Face B | 7.7 |
| Brightness (%) | | 89-90 |
| (ISO 2470) | | |
| Opacity (%) | | 92 |
| ISO 2471:2008 | | |

Example 2

The following composition (Table 7) was used to produce Compound "C" (used in the production of the core material):

TABLE 7

| Component | Weight % |
|---|---|
| Chevron Phillips: Marlex ® 5502BN HDPE (MFI 0.35 g/10 min & density 0.954 g/cm³) | 38.0 |
| Repsol Quimica: Repsol ® 5502E HDPE (MFI 0.2 g/10 min & density 0.954 g/cm³) | 26.0 |
| Omya: Omyalene 102M (86% CaCO₃ in wax carrier) | 16.7 |
| Schulman: Polywhite 8176 (75% TiO₂ in 14 g/10 min MFI LLDPE) | 6.6 |
| Styrosolutions: Empera 124N Polystyrene | 4.1 |
| Euro Yser: RD 18/26-III Pentaerythritol ester of fumaric rosin | 8.2 |
| Ciba Geigy: Irganox BF215 antioxidant additive | 0.25 |
| Akzo Nobel: Nourymix AE375 antistatic additive | 0.15 |

HDPE = High density polyethylene
MFI = Melt flow index

Compound "C" indicated above was prepared by extruding a mixture of 38 wt % of Chevron Phillips Marlex® 5502BN HDPE with 62 wt % of the concentrate mixture set out in Table 8 below.

TABLE 8

| Component | Weight % |
|---|---|
| Repsol Quimica Repsol ® 5502E (MFI 0.2 g/10 min & density 0.954 g/cm$^3$) | 41.9 |
| Omya Omyalene 102M (86% CaCO$_3$ in wax carrier) | 26.9 |
| Schulman Polywhite 8176 (75% TiO$_2$ in 14 g/10 min MFI LLDPE) | 10.6 |
| Styrosolution Empera 124N polystyrene | 6.6 |
| Euro Yser RD 18/26-III Pentaerythritol ester of fumaric rosin | 13.2 |
| Irganox BF255 antioxidant additive | 0.4 |
| Akzo Nobel Nourymix AE375 antistatic additive | 0.3 |

HDPE = High density polyethylene
MFI = Melt flow index

The above 38:62 mixture (Compound "C") formed the core layer, which was co-extruded with outer (top and bottom) skin layers each having the composition (Compound "D") set out in Table 9 below:

TABLE 9

| Component | Weight % |
|---|---|
| Chevron Phillips Marlex ® 5502BN HDPE (MFI 0.35 g/10 min & density 0.954 g/cm$^3$ | 84.0 |
| Ineos Polypropylene 100-GA03 Homopolymer (MFI 3.0 g/10 min) | 8.0 |
| Schulman Polywhite 8176 (75% TiO$_2$ in 14 g/10 min MFI LLDPE) | 8.0 |

Compound "C" was fed to an in-line extruder of a twin extruder-distributor-sheeting die co-extrusion arrangement and Compound "D" was fed to a secondary extruder. The sheeting die and distributor were of conventional type enabling a three-layer co-extrudate to be produced continually comprising a layer of Compound "D" on each side of a layer of Compound "C".

The extruders were arranged to enable each to form and feed a substantially homogeneous melt into the distributor which was maintained at a temperature of 210° C. The die lips were adjusted to approximately 4.5 mm and the flow of each of the melts was adjusted to give a composite layered extrudate about 500 mm wide at an extrusion rate of 380 kg/hr. The weight % ratios of core layer to the skin layers were 95% to 5% (2×2.5%).

The composite extrudate was then fed directly onto and around a set of cooling and conditioning rollers running at a peripheral speed whereby the core material was brought to a temperature of approximately 122° C. and the outer layers each to a temperature of approximately 118° C. This resulted in a conditioned composite extrudate having an overall thickness of 1.5 mm, a core thickness of 1.425 mm and two outer layers each being about 0.0375 mm thick.

The thus conditioned composite extrudate was then fed into a simultaneous biaxial stretching apparatus of the type described in our published GB-A-1442113 with reference to FIGS. 1 to 9 of that publication and arranged to provide a 4:1 stretch in each of the longitudinal or machine direction (MD) and transverse direction (TD).

The stretching apparatus was provided with a seven zone circulating air oven, the zones comprising preheat Zones 1 and 2, stretching Zones 3-5 and annealing Zones 6 and 7.

The temperatures and lengths of the respective zones and the sheet speed are tabulated below in Table 5:

TABLE 10

| Zones | Temperature (° C.) | Length (metres) | Speed (metres/min) |
|---|---|---|---|
| Preheat Zone 1 | 118 | 1.0 | 13.8 |
| Preheat Zone 2 | 118 | 1.0 | 13.8 |
| Stretch Zone 3 | 118 | 1.0 | Increasing |
| Stretch Zone 4 | 118 | 1.0 | Increasing |
| Stretch Zone 5 | 118 | 1.0 | Increasing |
| Annealing Zone 6 | 140 | 1.0 | 55.5 |
| Annealing Zone 7 | 140 | 1.0 | 55.5 |

The web gripping devices which were initially at a pitch of about 38 mm were heated to approximately 100° C. prior to contacting the sheet.

The composite plastics film thus produced had an average thickness of 83 microns and a substance of 50 g/m$^2$. The film was cooled, edge trimmed and passed through a corona discharge treatment unit adjusted to give a treatment level such that the wettability of the surface of each outer skin layer was greater than 40 dynes/cm, and then reeled.

The wettability of the product was determined by the application of Sherman Surface Tension Ink 47 dynes/cm, formulated to demonstrate a wettability of at least 47 dynes/cm.

The composite plastics films could be readily printed upon using conventional lithographic and gravure printing techniques.

The physical properties of the composite plastics films thus produced were as follows (Table 11):

TABLE 11

| Substance (g/m$^2$) | | 50 |
|---|---|---|
| Thickness (μm) | | 83 |
| Tensile Strength (N/mm$^2$) | MD | 47 |
| ISO 527-3:1995 | TD | 42 |
| Elongation at Break (%) | MD | 141 |
| ISO 527-3:1995 | TD | 128 |
| Surface Cohesion (N/25 mm) | Face A | 2.6 |
| | Face B | 2.6 |
| Brightness (%) | | 91-92 |
| (ISO 2470) | | |
| Opacity (%) | | 90 |
| ISO 2471:2008 | | |

What is claimed is:

1. A formulation for making voided plastics film, the formulation comprising a polyolefin, a filler and a voiding agent, wherein the voiding agent is either a glycerol ester of fumaric rosin or a pentaerythritol ester of fumaric rosin and has an average minimum Ring and Ball softening point in the range of 155° C. to 175° C.

2. The formulation according to claim 1 wherein the amount of the voiding agent comprising either a glycerol ester of fumaric rosin or a pentaerythritol ester of fumaric rosin is in the range 4-18 parts by weight per 100 parts of the polyolefin.

3. The formulation according to claim 1, wherein the polyolefin comprises HDPE.

4. The formulation according to claim 1, further comprising polystyrene in a range of 3.5-9 parts by weight per 100 parts of the polyolefin.

5. The formulation according to claim 1, wherein the filler comprises calcium carbonate in a range of 12-37 parts by weight per 100 parts of the polyolefin.

6. The formulation according to claim 1, wherein the filler comprises titanium dioxide in a range of 4-11 parts by weight per 100 parts of the polyolefin.

7. A voided plastics film comprising the formulation according to claim 1.

8. The voided plastics film according to claim 7, wherein the voided plastics film is a biaxially-oriented film.

9. A voided plastics film according to claim 7, wherein the voided plastics film has the composition shown below:

| Component | Parts by weight |
| --- | --- |
| High density polyethylene | 100 |
| Voiding agent (glycerol ester of fumaric rosin or pentaerythritol ester of fumaric rosin) | 4-18 |
| Polystyrene | 3.5-9 |
| Calcium carbonate filler | 12-37 |
| Titanium dioxide | 4-11. |

10. A composite plastics film including a core or base layer and at least one skin layer, wherein the core or base layer comprises a voided plastics film made from the formulation according to claim 1.

11. The composite plastics film according to claim 10, wherein said core or base layer and said at least one skin layer are co-extruded.

12. The composite plastics film according to claim 10, wherein said composite plastics film comprises a synthetic paper.

13. The composite plastics sheet according to claim 12 wherein said synthetic paper comprises at least one printable surface.

14. A method of making a voided plastics film, the method comprising providing the formulation according to claim 1, forming a plastics sheet from the formulation, and orienting the plastics sheet biaxially by stretching the plastics sheet to form a voided plastics film.

15. The method according to claim 14, further comprising providing a second formulation comprising a polyolefin, co-extruding the formulation and the second formulation to form a composite plastics sheet, and orienting the composite plastics sheet biaxially to form a composite plastics film comprising a voided base or core layer and at least one skin layer.

16. The method according to claim 14, wherein the composite plastics film comprises a synthetic paper.

* * * * *

UNITED STATES PATENT AND TRADEMARK OFFICE
CERTIFICATE OF CORRECTION

| | |
|---|---|
| PATENT NO. | : 9,850,359 B2 |
| APPLICATION NO. | : 14/850530 |
| DATED | : December 26, 2017 |
| INVENTOR(S) | : Jonathan Cooper, Bharath Chandra and Mark Grimbley |

It is certified that error appears in the above-identified patent and that said Letters Patent is hereby corrected as shown below:

In the Specification

Column 7, Line 13, "MWI" should be --MFI--.

Column 7, Line 26, "Marflex" should be --Marlex--.

In the Claims

Column 12, Line 7 (Claim 13), "sheet" should be --film--.

Signed and Sealed this
First Day of May, 2018

Andrei Iancu
*Director of the United States Patent and Trademark Office*